United States Patent
Munro et al.

(10) Patent No.: US 6,410,926 B1
(45) Date of Patent: Jun. 25, 2002

(54) COATING WITH OPTICAL TAGGENT

(75) Inventors: Calum H. Munro, Wexford; Michael L. White, Pittsburgh; Michael J. Pawlik, Shaler Township; Ralph C. Gray, Butler; Gregory J. McCollum, Hampton Township, all of PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/410,776

(22) Filed: Oct. 1, 1999

(51) Int. Cl.$^7$ ............................................. G01N 21/64
(52) U.S. Cl. .................................. 250/459.1; 250/302
(58) Field of Search ........................ 250/459.1, 461.1, 250/302

(56) References Cited

U.S. PATENT DOCUMENTS

| | | | |
|---|---|---|---|
| 4,250,382 A | * 2/1981 | Libby | 250/302 |
| 4,651,011 A | * 3/1987 | Ors et al. | 250/459.1 |
| 5,034,556 A | 7/1991 | Kahle, II | 558/155 |
| 5,171,450 A | 12/1992 | Hoots | 210/701 |
| 5,294,265 A | 3/1994 | Gray et al. | 148/250 |
| 5,306,526 A | 4/1994 | Gray et al. | 427/309 |
| 5,451,270 A | 9/1995 | Ouyang et al. | 148/241 |
| 5,500,053 A | 3/1996 | Ouyang et al. | 427/247 |
| 5,516,696 A | 5/1996 | Rivera | 436/56 |
| 5,624,995 A | 4/1997 | Kira et al. | 524/554 |
| 5,653,823 A | 8/1997 | McMillen et al. | 148/247 |
| 5,654,198 A | 8/1997 | Carrier et al. | 436/6 |
| 5,717,217 A | * 2/1998 | Neckers et al. | 250/459.1 |

OTHER PUBLICATIONS

Kirk–Othmer, Encyclopedia of Chemical Technology, Fourth Edition, p. 772.

* cited by examiner

Primary Examiner—Georgia Epps
Assistant Examiner—Richard Hanig
(74) Attorney, Agent, or Firm—William J. Uhl

(57) ABSTRACT

A method for determining the thickness of a dryable or curable film-forming coating by incorporating a fluorescent component into the coating. The fluorescent component is either a resin solid of the coating, a fluorescent dye or a fluorescent dye attached to a resin solid of the coating. The coating is exposed to ultraviolet or visible light which causes the fluorescent component to fluoresce. The intensity of the fluorescence of the coating is measured and the thickness or weight of the coating is determined from a known mathematical relationship between the fluorescence intensity of the coating when exposed to the light and the thickness or weight of the coating. Additionally, a curable or dryable film-forming coating composition including a curable or dryable organic resin reacted with a fluorescent tag is provided.

25 Claims, 3 Drawing Sheets

COATING WITH OPTICAL TAGGENT

BACKGROUND OF THE INVENTION

1. Field of the Invention

The present invention relates to a method for determining the thickness of a coating on a substrate, particularly on a metal substrate, and to coating compositions adapted for use in such a method.

2. Description of the related art

It is known to pre-treat metal substrates, particularly zinc, aluminum and their alloys with chromium-containing compositions to inhibit corrosion and promote adhesion of subsequently applied coatings. While effective, there are several disadvantages to using chromium treatments for this purpose. First, chromium treatments can cause yellow or blue discoloration of the substrate. Additionally, darkening of the substrate is occasionally observed after the chromium-treated substrate has been post-oiled for forming or lubrication. Also, once the metal substrate is chromium treated, no further post-treatment of the substrate, such as zinc phosphating, can be performed. This makes chromium treated metals unsuitable for use in coil coating and in automotive applications. Lastly, chromium is undesirable because of toxicity and waste disposal concerns.

Alternatives to chromium treatment have been described. Metal can be passivated with inorganic phosphate. Alternatively, the metal can be pre-treated with a curable or dryable film-forming organophosphates. For instance, vinyl polymers, i.e. acrylic polymers, and epoxy compounds having pendant phosphate groups can be applied to metal to provide a protective coating. Suitable curable film-forming organophosphate coatings are those of U.S. Pat. No. 5,294,265, which is incorporated herein by reference. These coatings are known by their commercial designation NUPAL®. These coatings are commonly prepared from the reaction product of a phosphate and an epoxide.

These organophosphate coatings are, typically, deposited onto the metal substrate by rolling, spraying or dipping. The coatings are typically very thin and difficult to measure without time- and resource-consuming titration experiments. For example, the coatings can range from less than about 55 mg per $m^2$ (5 mg per $ft^2$) to over 430 mg per $m^2$ (40 mg per $ft^2$). Coatings of this range of thickness, especially coatings of less than 54 mg per $m^2$ (5 mg per $ft^2$), are typically difficult to measure with accuracy and precision by standard titration methods. Further, titration methods for determining coating thickness, such as the cerium titration method, are invasive, destructive to the metal and take significant time to complete. It is therefore desirable to have a non-invasive method by which the thickness of coatings, especially of very thin coatings, can be determined rapidly and automatically with precision and accuracy, e.g. on a moving strip in a rolling mill.

Methods for determining the presence of thin films on a substrate are known. For instance, U.S. Pat. No. 5,516,696 discloses using certain fluorescent dyes in metal film coatings to determine whether or not the coating has been applied to the surface. Specifically, the fluorescent brightening agents stilbene and coumarin are added to a chrome-free metal coating and, after coating the metal with the coating, the metal is viewed under ultraviolet (UV) light and the presence of coating is detected by eye. Although useful in its ability to determine whether a coating has been applied to a substrate, the methods described in that patent do not involve quantitative determination of the thickness of the coating, an important quality control matter. Although possible, use of stilbene and coumarin in quantitative determinations of thickness of a coating is not preferred because it has been found that these compounds often do not display the required precision in their use in a calibrated system to determine coating thickness that is required in a commercially feasible coating thickness measurement system. The native fluorescence of the coating can interfere with measurement of fluorescent intensity of the coating. Further, when these compounds are used according to the prior art patent, they can be extracted during subsequent processing with liquid surface contact or migrate into additional coating layers which are applied onto the coating.

Methods for determining thickness of transparent oil films on metal surfaces by detection of fluorescent compounds mixed in the oil are also known. However, due to the nature of oil films, these methods are not precise and, therefore, are not suitably reproducible for determination of the thickness of a dryable, dried, curable or cured film-forming coating on a substrate. Further, a method is needed to determine the thickness of films that are not as transparent as oil. Choice of dye is not important when the dye is used to measure oil film thickness. The layer of oil is typically not maintained on the surface of the substrate if additional layers of a coating are needed on the oil-covered substrate, such as a pre-coating a primer or a color coat. Since the oil layer is removed, there are no considerations of the effect of dye migration. Lastly, the dyes used to determine the oil film thickness show strong substrate dependence; i.e. coumarin or 4-(dicyanomethylene)-2-methyl-6-(4-dimethyl-aminostyryl)-4H-pyran, CAS No. 51325-91-8 ("DCM").

SUMMARY OF THE INVENTION

The present invention provides a method for precisely and accurately measuring the thickness of a coating on a substrate. The coating is prepared from a curable or dryable film-forming coating composition, preferably including an organic resin and a fluorescent component. The fluorescent component is either an intrinsic fluorescence of an organic resin in the coating or a fluorescent dye distributed within the coating or covalently linked to an organic resin. A mathematical relationship is determined by a calibration procedure which relates the fluorescence intensity of the coating when exposed to a light source to the coating thickness. The mathematical relationship is then used to determine the thickness of the coating on a test sample. The thickness of the coating on the test sample is determined by exposing the coating to light of a wavelength suitable to cause the fluorescent component of the coating to fluoresce and determining the thickness of the coating on the test substrate based upon the pre-determined mathematical relationship. Surprisingly, it has been found that the coating does not need to be entirely transparent and the method is not substrate dependent.

The present invention is also directed to a facility for performing the method of the present invention. The facility includes, minimally, a detection station. Prior to reaching the detection station, a test substrate is coated with a curable or dryable film-forming coating containing a fluorescent component. At the detection station, the coating is exposed to light from a light source of a wavelength sufficient to cause the fluorescent component of the coating to fluoresce. The intensity of the fluorescence of the coating is detected by a detector that is capable of producing an analog or digital signal, which indicates the intensity of the fluorescent emission of the coating. Preferably, the detector is connected to a computing device which receives the analog or digital signal of the detector and converts the signal to a reading of the thickness of the coating by converting the signal to a measurement of the intensity of the fluorescent emission of the coating. The computing device then calculates the thickness of the coating on the substrate by entering the measurement of the intensity of the fluorescent emission of the coating into a predetermined mathematical relationship between the thickness of the coating and the intensity of fluorescent emissions from the coating when exposed to the light. The station where the substrate is coated and the detecting station need not be on the same manufacturing line, or even in the same location.

The present invention also includes a curable or dryable film-forming coating composition which includes a curable or dryable film-forming organic resin having a fluorescent tag attached thereto. Preferably, the tag is a dye. Most preferably the dye is a fluorescein or a rhodamine.

Lastly, the present invention includes a coated substrate having a coating of the curable or dryable film-forming coating composition.

DETAILED DESCRIPTION OF THE PREFERRED EMBODIMENTS

Figure 1:
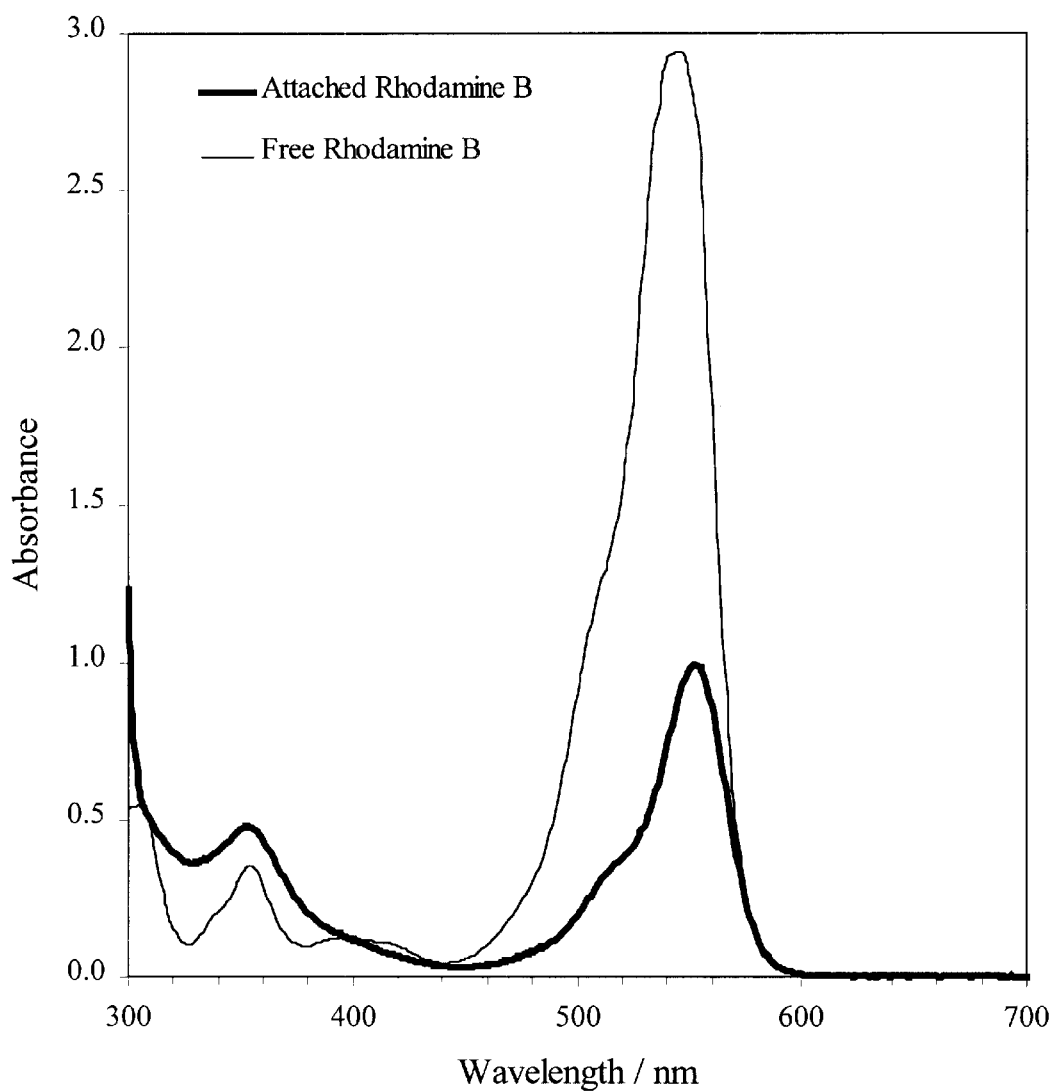
FIG. 1 is a graph showing the intensity and wavelength of molecular absorption for attached and free rhodamine B.

The present invention is directed to a method for determining the thickness of a coating on a substrate, preferably on a metal substrate. The method uses a fluorescent compound distributed homogeneously within a coating as an indicator and exploits a relationship between the thickness of the coating and the intensity of fluorescence of the coating when exposed to visible or UV electromagnetic radiation (hereinafter collectively referred to as "light"). By calibrating the relationship between the thickness of the coating and the fluorescence intensity of the coating when exposed to light, the thickness of the same coating on a test substrate can be determined. Surprisingly, when the coating is a pretreatment, or the like, and is subsequently covered with additional primer and/or color coating layers, the presence of the fluorescent material does not substantially affect the appearance of the finished product.

Although the embodiments described herein are directed to determining the thickness of a primary protective (pretreatment) coat on bare metal, the method can be used to determine coating thickness for any film-forming coating composition, so long as the applied coating composition is sufficiently transparent to practice the method. The pretreatment coat can be any pretreatment coat, organic or inorganic, but is preferably one which includes an organic resin, such as an acrylic, an epoxy, a vinyl polymer, a silicone, a polyamide, a urethane or a polyester.

Substrates useful in the practice of the present invention include, without limitation, ferrous metals, non-ferrous metals and combinations thereof. Suitable ferrous metals include iron, steel, and alloys thereof. Non-limiting examples of useful steel materials include cold rolled steel, galvanized (zinc coated) steel, electrogalvanized steel, stainless steel, pickled steel, zinc-iron alloy such as galvanneal, and combinations thereof. Useful non-ferrous metals include aluminum, zinc, magnesium and alloys thereof, such as the GALVALUME brand and the GALFAN brand zinc-aluminum alloys. Combinations or composites of ferrous and non-ferrous metals can also be used.

The shape of the substrate can be in the form of a sheet, plate, bar, rod or any shape desired. Typically, the shape of the substrate is an elongated metal strip wound about a spool in the form of a coil. The thickness of the strip usually ranges from about 0.254 to about 3.18 millimeters (mm) (about 10 to about 125 mils), and often about 0.3 mm, although the thickness can be greater or less, as desired. The width of the strip generally ranges from about 30.5 to about 183 centimeters (about 12 to about 72 inches), although the width can vary depending upon its intended use.

If the substrate is a metal substrate, before depositing pretreatment coatings upon the surface of the metal substrate, foreign matter is typically removed from the metal surface by thoroughly cleaning and degreasing the surface. The surface of the metal substrate can be cleaned by physical means, such as by mechanical abrasion, or by chemical means, such as by cleaning/degreasing the surface with commercially available alkaline or acidic cleaning agents, such as sodium metasilicate and sodium hydroxide. A non-limiting example of a cleaning agent is CHEMKLEEN 163 phosphate cleaner, which is commercially available from PPG Industries, Inc. of Pittsburgh, Pa. Following the cleaning step, the metal substrate is usually rinsed with water, preferably deionized water, in order to remove any residue. The metal substrate can be air dried using an air knife, by flashing off the water by brief exposure of the substrate to a high temperature or by passing the substrate between squeegee rolls.

In the present invention, a pretreatment coating is deposited upon at least a portion of the outer surface of the metal substrate. The entire outer surface of the metal substrate is coated with the pretreatment coating.

The pretreatment coating facilitates adhesion of a subsequently applied weldable coating to the metal substrate. The pretreatment coating should be sufficiently thin and/or deformable to permit the heat and force applied to the weldable coating by the welding tool to drive at least a portion of the electroconductive pigment therein through the pretreatment coating to contact, or to essentially contact, the metal substrate and to provide an electrically conductive path to permit welding of the coated substrate. As used herein "essentially contact" means that the electrical resistance provided by the pretreatment coating is less than about 1 ohm. The thickness of the pretreatment coating can vary, but is generally less than about 1 micrometer, preferably ranges from about 1 to about 500 nanometers, and more preferably is about 10 to about 300 nanometers.

In one embodiment, the pretreatment coating comprises a reaction product of one or more epoxy-functional materials and one or more materials selected from phosphorus-containing materials, amine-containing materials and mixtures thereof. Non-limiting examples of such pretreatment coating materials are described in U.S. Pat. No. 5,294,265 and are available commercially from PPG Industries, Inc. under the trade designation NUPAL.

Useful epoxy-functional materials contain at least one epoxy or oxirane group in the molecule, such as monoglycidyl ethers of a monohydric phenol or alcohol or di- or polyglycidyl ethers of polyhydric alcohols. The epoxy-functional material typically contains at least two epoxy groups per molecule and has aromatic or cycloaliphatic functionality to improve adhesion to the metal substrate. Further, the epoxy-functional materials are usually more hydrophobic than hydrophilic in nature.

Examples of suitable monoglycidyl ethers of a monohydric phenol or alcohol include, without limitation, phenyl glycidyl ether and butyl glycidyl ether. Useful polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin (preferred). Suitable polyhydric alcohols can be aromatic, aliphatic or cycloaliphatic.

Non-limiting examples of suitable aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane, i.e., bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Suitable epoxy-functional materials have an epoxy equivalent weight ranging from about 100 to about 6000, and usually about 130 to about 250, as measured by titration with perchloric acid using methyl violet as an indicator. Useful epoxy-functional materials are disclosed in U.S. Pat. Nos. 5,294,265; 5,306,526 and 5,653,823, which are incorporated herein by reference.

Examples of suitable commercially available epoxy-functional materials are, without limitation, EPON® 826 and 828 epoxy resins, which are epoxy functional polyglycidyl ethers of bisphenol A prepared from bisphenol A and epichlorohydrin and are commercially available from Shell Chemical Company. EPON® 828 epoxy resin has a number average molecular weight of about 400 and an epoxy equivalent weight of about 185–192. EPON® 826 epoxy resin has an epoxy equivalent weight of about 178–186.

Other useful epoxy-functional materials include epoxy-functional acrylic polymers, glycidyl esters of carboxylic acids and mixtures thereof.

As discussed above, the epoxy-containing material can be reacted with one or more phosphorus-containing materials to form an ester thereof, such as an organophosphate or organophosphonate. Suitable phosphorus-containing materials include phosphoric acids, phosphonic acids and mixtures thereof.

Examples of suitable phosphonic acids include those having at least one group of the structure:

where R is —C—, $CH_2$, or O—CO—$(CH_2)_2$—. Non-limiting examples of suitable phosphonic acids include 1-hydroxyethylidene-1,1-diphosphonic acid, methylene phosphonic acids, and alpha-aminomethylene phosphonic acids containing at least one group of the structure:

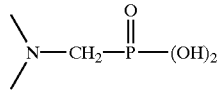

such as (2-hydroxyethyl)aminobis(methylene phosphonic) acid, isopropylaminobis(methylenephosphonic) acid and other aminomethylene phosphonic acids disclosed in U.S. Pat. No. 5,034,556, which is incorporated herein by reference, at column 2, line 52 to column 3, line 43.

Other useful phosphonic acids include alpha-carboxymethylene phosphonic acids containing at least one group of the structure:

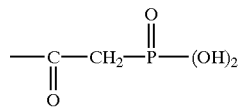

Non-limiting examples of suitable phosphonic acids include benzylaminobis(methylene phosphonic) acid, cocoaminobis(methylene phosphonic) acid, triethylsilylpropylamino(methylene phosphonic) acid and carboxyethyl phosphonic acid. Aromatic phosphonic acids such as phenyl phosphonic acid may also be used.

Suitable esters of phosphorus-containing materials include esters of any of the phosphoric acid or phosphonic acids discussed above, for example phosphoric acid esters of bisphenol A diglycidyl ether, benzylaminobis (methylenephosphonic) ester of bisphenol A diglycidyl ether, carboxyethyl phosphonic acid ester of bisphenol A diglycidyl ether, phenylglycidyl ether and butyl glycidyl ether; carboxyethyl phosphonic acid mixed ester of bisphenol A diglycidyl ether and butylglycidyl ether; triethoxyl silyl propylaminobis(methylenephosphonic) acid ester of bisphenol A diglycidyl ether and cocoaminobis (methylenephosphonic) acid ester of bisphenol A diglycidyl ether.

The epoxy-containing material and phosphorus-containing material are typically reacted in an equivalent ratio of about 1:0.5 to about 1:10, and preferably about 1:1 to about 1:4. The epoxy-functional material and phosphorus-containing material can be reacted together by any method well known to those skilled in the art, such as a reverse phosphatization reaction in which the epoxy-containing material is added to the phosphorus-containing material.

Typically, the reaction product of the epoxy-functional material and phosphorus-containing material has a number average molecular weight of up to about 100,000, and usually about 500 to about 1000, as measured by gel permeation chromatography using polystyrene as a standard.

In an alternative embodiment, the pretreatment coating comprises one or more esters of a phosphorus-containing material, for example such as are discussed above. Other suitable esters include the reaction product of phosphorus pentoxide as $P_4O_{10}$ and an alcohol in a 1:6 molar ratio of oxide to alcohol to produce a mixture of mono- and diphosphate esters, such as is disclosed in the 18 *Encyclopedia of Chemical Technology,* (4th Ed. 1996) at page 772, which is hereby incorporated by reference. Examples of suitable alcohols include aliphatic alcohols such as ethylene glycol, phenols such as bisphenol A, and cycloaliphatic alcohols.

In an alternative embodiment of pretreatment coating, the reaction product can be formed from one or more epoxy-containing materials, such as are discussed above, and one or more amine-containing materials selected from primary amines, secondary amines, tertiary amines and mixtures thereof. Non-limiting examples of suitable primary amines include n-butyl amine and fatty amines such as ARMEEN 18D which is commercially available from Akzo Nobel Chemicals, Inc., McCook, Ill. Suitable secondary amines include diisopropanolamine, diethanolamine and di-butyl amine. An example of a useful tertiary amine is ARMEEN DM18D dimethyl C18 tertiary amine.

The amine-containing material typically comprises at least one alkanolamine or a mixture of different alkanolamines. Primary or secondary alkanolamines are commonly used, however tertiary alkanolamines can also be used. The alkanolamines typically include alkanol groups containing less than about 20 carbon atoms, and often less than about 10 carbon atoms. Non-limiting examples of suitable alkanolamines include methylethanolamine, ethylethanolamine, diethanolamine (preferred), methylisopropanolamine, monoethanolamine and diisopropanolamine. Preferred tertiary alkanolamines contain two methyl groups, such as dimethylethanolamine.

The epoxy-functional material and amine-containing material are typically reacted in an equivalent ratio of epoxy groups to amine groups ranging from about 5:1 to about 0.25:1, and more typically about 2:1 to about 0.5:1. The epoxy-functional material and amine-containing material can be reacted together by any method well known to those skilled in the art of polymer synthesis, such as solution or bulk polymerization techniques. For example, an alkanolamine can be added to an epoxy-functional material and diluent, mixed at a controlled rate and the mixture heated at a controlled temperature under a nitrogen blanket or other procedure well known to those skilled in the art for reducing the presence of oxygen during the reaction. Suitable diluents for reducing the viscosity of the mixture during the reaction include water; alcohols containing up to about 8 carbon atoms, such as ethanol or isopropanol; and glycol ethers such as the monoalkyl ethers of ethylene glycol, diethylene glycol or propylene glycol.

If a tertiary alkanolamine is used, a quaternary ammonium compound is formed. Typically, this reaction is carried out by adding all of the raw materials to the reaction vessel at the same time and heating the mixture, usually with a diluent, at a controlled temperature. Usually, an acid such as a carboxylic acid is present to ensure that the quaternary ammonium salt is formed rather than a quaternary ammonium oxide. Suitable carboxylic acids include lactic acid, citric acid, adipic acid and acetic acid (preferred). Quaternary ammonium salts are useful because they are more easily dispersed in water and can be used to form an aqueous dispersion having a pH near the desired application range.

Generally, the reaction product of the epoxy-functional material and amine-containing material has a number average molecular weight of up to about 6000, and typically about 500 to about 750, as measured by gel permeation chromatography using polystyrene as a standard.

A treating solution of one or more of any of the reaction products discussed above can be prepared by mixing the reaction product(s) with a diluent, such as water, usually at a temperature of about 10° C. to about 70° C., and more commonly about 15° C. to about 25° C. The reaction product is usually soluble or dispersible in water diluent to the extent of at least about 0.03 grams per 100 grams of water at a temperature of about 25° C. The reaction product generally comprises about 0.05 to about 10 weight percent of the treating solution on a total weight basis.

Useful diluents include water or mixtures of water and cosolvents. Suitable cosolvents include alcohols having up to about 8 carbon atoms, such as ethanol and isopropanol; and alkyl ethers of glycols, such as 1-methoxy-2-propanol, dimethylformamide, xylene, and monoalkyl ethers of ethylene glycol, diethylene glycol and propylene glycol. The diluent includes a propylene glycol monomethyl ether such as DOWANOL PM or dipropylene glycol monomethyl ether DOWANOL DPM, which are commercially available from Dow Chemical Company. Other useful diluents include bases such as amines which can partially or completely neutralize the organophosphate or organophosphonate to enhance the solubility of the compound. Non-limiting examples of suitable amines include secondary amines, such as diisopropanolamine (preferred), and tertiary amines such as triethylamine, dimethylethanolamine and 2-amino-2-methyl-1-propanol. Non-aqueous diluents are typically present in amount ranging from about 0.1 to about 5 weight percent on a basis of total weight of the treating solution. Water can be present in amount ranging from about 50 to about 99 weight percent on a basis of total weight of the treating solution.

Typically, water-soluble or water-dispersible acids and/or bases are used to adjust the pH of the treating solution to about 2 to about 8.5, and preferably about 2.7 to about 6.5. Suitable acids include mineral acids, such as hydrofluoric acid, fluoroboric acid, phosphoric acid, sulfamic acid, and nitric acid; organic acids, such as lactic acid, acetic acid, hydroxyacetic acid, citric acid; and mixtures thereof. Suitable bases include inorganic bases, such as sodium hydroxide and potassium hydroxide; nitrogen-containing compounds such as ammonia, triethylamine, methanolamine, diisopropanolamine; and mixtures thereof.

The treating solution may further comprise a fluorine-containing material as a source of fluoride ions. Suitable fluorine-containing materials include hydrofluoric acid, fluorosilicic acid, fluoroboric acid, sodium hydrogen fluoride, potassium hydrogen fluoride, ammonium hydrogen fluoride and mixtures thereof. When present, the concentration of fluorine-containing material in the pretreatment coating may range from about 100 to about 5200 parts per million (ppm) and more commonly about 300 to about 3500 ppm. Generally, the weight ratio of reaction product to fluoride ions ranges from about 10:1 to about 55:1.

The fluorine-containing material can be applied to the metal substrate prior to application of the treating solution or included in the treating solution itself. If applied prior to application of the treating solution, the pH of an aqueous solution including the fluorine-containing material generally ranges from about 2.4 to about 4.0 and can be adjusted by adding sodium hydroxide.

The treating solution may further comprise one or more Group IVB element-containing materials, e.g., zirconium, titanium and hafnium. The Group IVB-element containing materials typically are in the form of metal salts or acids which are water soluble. Non-limiting examples of suitable zirconium-containing materials include fluorozirconic acid, potassium hexafluorozirconate, alkali salts of zirconium hexafluoride, amine salts of zirconium hexafluoride and mixtures thereof. Non-limiting examples of suitable titanium-containing materials include fluorotitanic acid, alkali salts of hexafluorotitanate, amine salts of hexafluorotitanate and mixtures thereof. The Group IVB-element containing materials can be the source of some or all of the fluorine-containing materials discussed above.

The Group IVB element-containing material may be included in the treating solution in an amount to provide a concentration of up to about 2000 ppm, and typically about 100 to about 1000 ppm, based upon total weight of the treating solution. Alternatively, the Group IVB-element containing material can be applied to the metal substrate prior to application of the treating solution.

The treating solution can further comprise surfactants that function as aids to improve wetting of the substrate. Generally, the surfactant materials are present in an amount of less than about 2 weight percent on a basis of total weight of the treating solution.

Typically, the treating solution is essentially free of chromium-containing materials, i.e., contains less than about 2 weight percent of chromium-containing materials (expressed as $CrO_3$), and more commonly less than about 0.05 weight percent of chromium-containing materials. Examples of such chromium-containing materials include chromic acid, chromium trioxide, chromic acid anhydride, dichromate salts such as ammonium dichromate, sodium dichromate, potassium dichromate, and calcium, barium, magnesium, zinc, cadmium and strontium dichromate. Usually, the treating solution is free of chromium-containing materials.

In one specific embodiment of the pretreatment coating, the reaction product of an epoxy-functional material and a phosphorus-containing material is formed from EPON® 828 epoxy-functional resin and phosphoric acid in an equivalent ratio of about 1:1.6. The reaction product is present in the treating solution in an amount of about 5 weight percent on a basis of total weight of the treating solution. This particular embodiment also includes diisopropanolamine, DOWANOL PM and deionized water. A small amount of hydrofluoric acid can be included to adjust the pH of the treating solution to about 5.

In another particular embodiment, the reaction product of an epoxy functional material and amine-containing material is formed from EPON® 828 epoxy-functional resin and diethanolamine. The reaction product is present in the treating solution in an amount of about 400 to about 1400 ppm based upon total weight of the treating solution. Zirconium ions are often present, added as fluorozirconic acid, at a level of about 75 to about 225 ppm based upon total weight of the treating solution. Other additives present include SURFYNOL® DF110L surfactant (about 20 ppm) and monomethyl ether of dipropylene glycol (about 300 ppm). The pH of the treating solution is adjusted to about 4.0 to about 4.7 using aqueous solutions of nitric acid and sodium hydroxide.

Other pretreating compositions can be used in the method of the preset invention. Examples of theresin content of these coatings include, without limitation, vinyls, such as acrylics and polyesters. Also, inorganic phosphating compositions may be employed.

The treating solution may be applied to the surface of the metal substrate by any conventional application technique, such as spraying, immersion or roll coating in a batch or continuous process. The temperature of the treating solution at application is typically about 10° C. to about 850° C., and preferably about 15° C. to about 60° C. The pH of the treating solution at application generally ranges from about 2.0 to about 7.0, and is usually about 2.7 to about 6.5.

Continuous processes are typically used in the coil coating industry and also for mill application. The treating solution can be applied by any of these conventional processes. For example, in the coil industry, the substrate is cleaned and rinsed and then usually contacted with the treating solution by roll coating with a chemical coater. The treated strip is then dried by heating and painted and baked by conventional coil coating processes.

Mill application of the treating solution can be by immersion, spray or roll coating applied to the freshly manufactured metal strip. Excess treating solution is typically removed by wringer rolls. After the treating solution has been applied to the metal surface, the metal can be rinsed with deionized water and dried at room temperature or at elevated temperatures to remove excess moisture from the coated substrate surface and cure any curable coating components to form the pretreatment coating. Alternately, the treated substrate can be heated at about 65° C. to about 125° C. for about 2 to about 30 seconds to produce a coated substrate having a dried residue of the pretreatment coating thereon. If the substrate is already heated from the hot melt production process, no post application heating of the treated substrate is required to facilitate drying. The temperature and time for drying the coating will depend upon such variables as the percentage of solids in the coating, components of the coating and type of substrate.

The film coverage of the residue of the pretreatment coating generally ranges from about 1 to about 1000 milligrams per square meter ($mg/m^2$), and is preferably about 10 to about 400 $mg/m^2$.

Central to the present invention is the incorporation of a fluorescent component into the coating which can be used to determine the thickness of the coating on a substrate. The fluorescent material can be: i) a fluorescent tag (typically a dye) which is dispersed throughout the coating on the substrate; ii) a fluorescent tag which is covalently linked to a curable resin in the coating; or iii) a dryable or curable organic film-forming resin in the coating which is intrinsically fluorescent and which will fluoresce when exposed to light.

In one embodiment of the present invention, a suitable fluorescent tag is mixed into the film-forming composition prior to its application to the metal substrate. The tag is not covalently linked to the film-forming solids, but may otherwise be associated with the solids. After the film-forming composition is applied to the substrate, it is dried or cured with the fluorescent tag dispersed throughout. The intensity of the fluorescence of the coating can be measured at any time after application of the coating to the substrate, whether or not the coating is dried or cured.

In another embodiment, the tag is covalently linked to a resin in the film-forming composition. By covalently linking the tag to the resin, the tag is permanently incorporated into the coating. This confers a number of benefits. First, the tag is not readily removed from the coating. When the tag is not covalently linked to the resin, and the substrate is further processed, the coating may lose the tag molecules disproportionately to resin molecules. When the thickness of the coating is measured immediately subsequent to the application and drying or curing of the coating, it may not be necessary to covalently link the dye to the resin. However, it is often desirable to measure the thickness of the coating layer after post processing the coated material, i.e. after rinsing the coating or shaping or cutting of the substrate. By covalently linking the tag to the resin, the tag will not be extracted disproportionately from the coating, which would lead to spurious coating thickness readings.

An additional benefit of using the covalently-linked tag is that the tag may not migrate when additional coating layers are applied atop the tagged coating layer. An undesirable consequence resulting from use of non-covalently linked tags is that the tags, which are often colorants, may affect the coloration of subsequent layers. However, it is preferred that the color of the tag does not affect the color of subsequent color coats. This is achieved when the tag is covalently linked to a resin in the coating composition.

A third form of tagging is to provide a resin which is naturally fluorescent. Organic resins used in coatings that contain aromatic rings have been found to fluoresce under certain circumstances suficiently to achieve the objects of the present invention. An example of this is bisphenol A-containing resins which fluoresce when applied to a metal surface, provided that the surface does not contain Fe or Zn. Aluminum surfaces are particularly suited for this embodiment; i.e., a NUPAL coated aluminum surface.

Fluorescent compounds which are suitable for use in the present invention share common features. First, they produce a bright fluorescence so that the fluorescence reaches detectable levels even when small amounts of the dye are used in the resin or the coating is very thin. Second, the compound does not self-quench readily when used in coatings of the desired thickness range. Third, the compound is preferably not significantly quenched by the coating or interfere with the formation of the coating. Fourth, although not required, it is useful in some applications if the compound has a characteristic color under visible light which is visibly detectable by eye in a coating of the desired thickness on a substrate. This would allow a qualitative determination of whether the coating is present on the substrate along with the ability to quantify the thickness of the coating according to the methods of the present invention. Fifth, the wavelength of light which causes the dye to fluoresce should be different from (i.e., must not overlap with) the wavelength of light emitted from the dye when it fluoresces. This ensures that there is no undue interference with the measurement of the intensity of the fluorescence by the light used to cause the dye to fluoresce.

For use in the method of the present invention in a given coating system, preferred tags in the coating produce a fluorescent emission which increases with thickness over the probable thickness range of the coating in a uniform manner. It is even more preferred that the increase be reproducible and capable of representing thickness as a function of fluorescent intensity. Most preferably, the relationship between the thickness of the coating and the fluorescent intensity is linear. Less suitable are those fluorescent tags that show irregular or non-linear responses which make calibration difficult, which would create imprecise results. Suitable tags are dyes which include, without limitation, acridines, anthraquinones, coumarins, diphenylmethanes, diphenylnaphthlymethanes, quinolines, stilbenes and triphenylmethanes.

Figure 2:
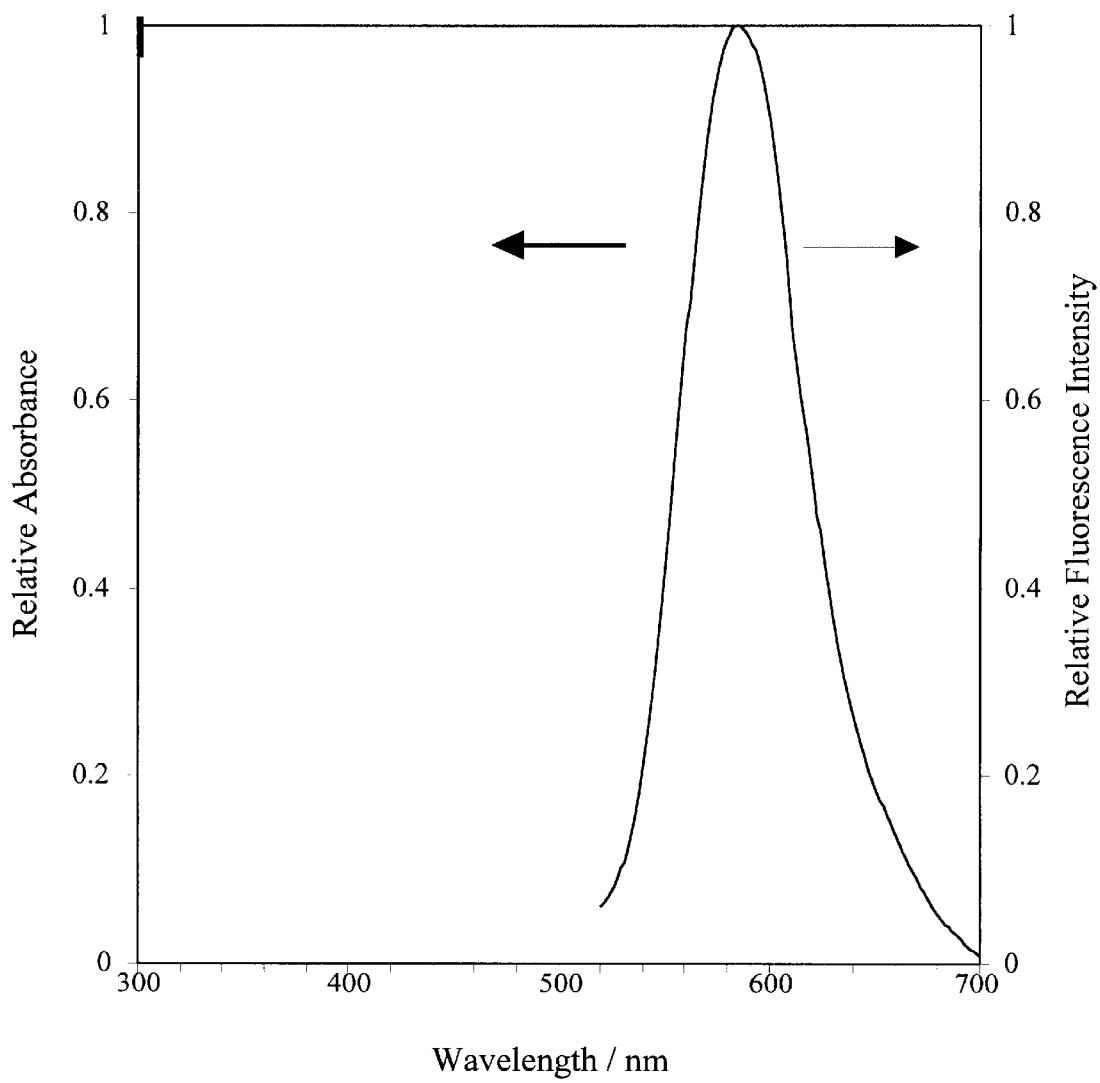
FIG. 2 is a graph showing the intensity and wavelength of molecular absorption and of fluorescent emission for attached rhodamine B.

In the embodiment where the fluorescent tag is covalently linked to the resin, the tag contains a group that is reactive with a functional group of the resin. Virtually any reactive functional group known in the polymer art for grafting or copolymerizing may be used. For example, when the resin contains epoxy groups, it is desirable to select a tag having carboxyl groups, or anhydrides thereof. Depending upon the reactive pendant groups of the resin, the dye could be bonded to the resin through other groups such as hydroxyl, anhydrides, amine, sulfide, mercaptan, isocyanate, isothiocyanate and phosphate. Important to the grafting of the dye to the resin is the retention of the fluorescence of the dye upon attachment. As shown in FIG. 1, after grafting onto an epoxy-phosphoric acid resin, rhodamine B loses some of its absorptivity and the color of the absorption is shifted slightly. Nevertheless, as shown in FIG. 2, rhodamine B is suitable for use in the present invention because it retains fluorescence upon attachment.

The choice of resins and coating compositions has some importance to the present invention. A number of characteristics of the coating may affect the ability of the method to accurately measure the thickness of a coating. The UV light should be able to travel through a substantial thickness of the coating and a substantial portion of the resultant fluorescence should be able to exit the coating. Excess amounts of some components of some coatings, such as dyes or pigments, may interfere with the method and should be included in quantities that do not substantially affect measurement of the thickness of the coating by the methods of the present invention. The particular resin content of a coating may also affect measurement of the thickness of the coating according to the methods of the present invention. Nevertheless, the method of the present invention is useful in measuring the thickness of the coating so long as the ingredients of the coating composition do not interfere with the ability to calibrate the relationship between fluorescence intensity and thickness of the coating. Tolerances may vary, depending upon the choice of fluorescent component, the expected thickness range to be determined, the compounds present in the coating and other constituents of the coating, such as dyes or resin solids. Nevertheless, for each system, the ability of the process of the present invention to detect accurately the thickness of the coating can be determined empirically according to the methods described herein.

The amount of fluorescent component in the coating is also of importance. Too little fluorescent component may be undetectable or difficult to detect practically. Too much fluorescent component may result in an inability to detect minor variations in fluorescent intensity attributable to minor changes in the thickness of the coating. This is because excessive amounts of fluorescent component can result in a quenching or self-absorptive effect, wherein the fluorescent intensity of the coating when exposed to light drops with an increase in dye concentration. Because each fluorescent component suitable for use in the method of the present invention has different fluorescent profiles and characteristics, the preferred concentration of the dye may vary broadly from dye-to-dye, and even from coating type-to-coating type. With regard to the embodiment of Synthetic Examples 1 and 2, listed below (rhodamine B grafted onto EPON 828 and reacted with phosphoric acid), the theoretical effective concentration range of rhodamine B is about 0.1 ppm to about 10,000 ppm of coating solids, with a practical concentration range of about 1 ppm to about 2,000 ppm coating solids (the theoretical minimum is the approximate lower limit which can be detected in a typical coating, while the practical limit is the approximate lower limit which can be rapidly detected under preferred measurement conditions in a manufacturing facility). The optimal concentration of the rhodamine can be determined empirically and will vary, depending upon the nature of the coating solids. As with rhodamine B, the optimal concentration of any given dye will vary, depending upon the coating system, and, sometimes, the nature of the substrate.

In use, the method of the present invention can be a two-step process in a typical manufacturing facility. First, at a coating station in a manufacturing facility, the coating of the present invention is applied. Second, the fluorescence of the coating is measured at a detection station. The fluorescence can be measured by methods known in the art. Typically, the second detection station includes a light source for emitting light onto the coating of a wavelength and intensity sufficient to cause the fluorescent component of the coating to fluoresce at detectable levels and a detector which collects light produced by the fluorescence of the fluorescent component of the coating and converts the collected light into an analog or digital signal indicative of the intensity of the fluorescence of the coating. The light source and the detector can be housed together in a probe head.

The light source emits electromagnetic radiation in the ultraviolet and/or visible spectral regions. A preferred light source is a mercury vapor lamp filtered optically such that only those emissions lines between 250 and 400 nm are incident upon an illuminated sample. Alternative light sources include, but are not limited to xenon lamps, deuterium lamps, hollow cathode lamps, tungsten lamps, ion lasers, solid state lasers, diode lasers and light emitting diodes. It is preferred that the energy or energy range of the light source used is coincident with that of one or more electronic absorption bands of the fluorescing agent incorporated into the sample, but not coincident with that of the fluorescence emission of the same fluorescing agent.

The second component of this station is a detector which collects light produced by the fluorescence of the fluorescent component of the coating and converts the collected light into an analog or digital electrical signal indicative of the intensity of the fluorescence of the coating. The detector contains optics for the collection and spectral filtering of light that is reflected by and emitted by a sample following illumination with light from the aforementioned light source. It is preferred, but not essential, that the spectral filtering optics reject light of energy or energy range coincident with that of the light source, while transferring, to the optical fiber, light of energy or energy range coincident with the fluorescence emission of the fluorescing agent in the sample. This light of energy or energy range coincident with the fluorescence emission of the fluorescing agent in the sample can be conveyed via optical fiber to the main detector unit. The detector unit can comprise any means known to one skilled in the art to isolate and measure electromagnetic radiation of an energy or energy range coincident with that of the fluorescence emission of the fluorescing agent in the sample. One embodiment of the main detector unit is a spectrograph comprising a single monochromator with a photodiode array. The light exiting the optical fiber enters the monochromator and is dispersed by energy using a grating and then is imaged onto the photodiode array to produce an electrical signal.

The signal is passed to a computing device, such as a general purpose or dedicated computer, which converts the signal into a reading of the thickness of the coating based upon a pre-determined relationship between the fluorescence intensity of the coating and the thickness or weight of the coating. The signal is, first, converted to a measurement of the fluorescence intensity of the coating. The thickness of the coating is then determined by entering the measurement of the fluorescence intensity into a formula describing the predetermined mathematical relationship between the thickness or weight of the coating and fluorescence intensity of the coating. Optionally, the computing device may be connected to an alarm device which is activated when the thickness of the coating falls outside of a critical range.

Because the coating may be applied, and the fluorescence of the coating may be measured at different times during the manufacture of the item, the two stations need not be sequential in a manufacturing line, or even in the same building or geographical location. For example, a metal roll or sheet can be coated in a mill and the thickness of the coating can be determined immediately following the application of the coating, or shortly thereafter following a drying or curing step.

A second coating station can be provided after the detection station for application of additional coating if the initial thickness of the coating falls below a desired critical thickness. This station would be inactive during normal operations, but can be activated manually or automatically when the coating thickness falls below a critical thickness. The amount of coating composition applied by this second coating station can be variable to prevent over-coating of the substrate, resulting in a coating which is too thick. The thickness of the coating applied by the second coating station can be controlled automatically by reference to the thickness of the substrate measured at the detection station. Typically, the activation of this station would be automatic and the activation would coincide with an alarm to notify operators of the line of the insufficient operation of the first coating station.

Alternatively, depending upon the nature of the coating and the logistics of the manufacturing process, the determination of the coating thickness can be made well after the coating step, and with many intervening steps. For instance, the metal can be slit, cut, shaped, stamped, welded or otherwise processed before the thickness of the coating is determined. In many instances, this is desirable in order to ascertain whether the coating remains on the manufactured item in a thickness sufficient to protect the underlying metal substrate. For example, steel strip may be manufactured and coated overseas and sold domestically to a manufacturer who processes the metal, and prior to application of a subsequent coating layer, would ascertain the thickness of the coating on the metal. In any case, the detection station can be followed by the above-described second coating station to ensure that the coating layer is of the desired thickness.

A calibration procedure is performed in order to correlate the measured fluorescence signal intensity with the weight/thickness of the coating containing the fluorescent component. At least 3 calibration standards are produced with known coating weights or thicknesses representative of the range of the coating weights or thicknesses that are desirable. It is preferred that a more statistically significant eight calibration standard samples are utilized, including 2 samples of blank substrate, two samples representative of target coating weight/thickness, two samples representative of low coating weight/thickness and two samples representative of high coating weight or thickness. These calibration standards may be prepared using coating methods known to one skilled in the art. The measured value of fluorescence intensity is determined using the measuring device (detector) described previously. The measured fluorescence intensity can be expressed as either the intensity at the energy of the maximum of the fluorescence emission spectrum, or as the area under the fluorescence emission spectrum. It is preferred, but not essential, that a statistically significant number of replicate measurements, e.g. six, are performed on each calibration standard sample. The coating weight for each calibration standard sample is then verified independently using any appropriate method known by one skilled in the art. A preferred independent method would be by cerium titration, as described below. A plot of verified coating weight versus measured fluorescence intensity yields a calibration plot. A mathematical expression of the relationship between Coating weight or thickness and fluorescence intensity can be derived by one skilled in the art from a best fit line through the points on the plot.

SYNTHETIC EXAMPLES

Fluorescent dye-grafted phosphate epoxy resins having fluorescent dye attached thereto were prepared according to synthetic Examples 1–5, as follows.

Example 1

2872.81 g of EPON 828 (15.28 epoxy equivalents; available from Shell chemical, Houston, Tex.), 921.44 g of methoxypropanol and 5.75 g (0.0120 mol) of acid-functional rhodamine B (basic violet #10, 500% fluorescent dye strength), available through Holliday Dyes and Chemical, Chicago, Ill.) were charged into a three-necked round bottom flask fitted with a condenser and a nitrogen inlet. The sample was heated for five (5) hours at 100° C. in which time the acid concentration (from rhodamine B) was reduced from the initial 0.00316 meq acid pre gram of reaction mixture to 0.00019 meq acid per gram of reaction mixture and the free rhodamine B content was substantially reduced, as confirmed by thin layer chromatography in acetone. This indicated that the rhodamine B has reacted, substantially, with the epoxy. The epoxy equivalent weight of the sample was 248 and the viscosity was 116 cps, as determined by a Brookfield DV-II viscometer at 30 RPM (spindle #2).

Example 2

61.49 g of 85% phosphoric acid and 13.20 g of methoxypropanol were charged to at three-necked round bottom flask fitted with a condenser and a nitrogen inlet and heated to 100° C. 268.57 g of the product of Example 1 was added over a one-hour period, using an addition funnel. The reaction was held at 100° C. for an additional hour. The epoxy equivalent weight of the resultant compound was >20,000. 36.00 g of deionized water was then added and the sample was held for one hour at 100° C. The reaction mixture was cooled to 70° C. and 99.36 g of diisopropanolamine and 200.50 g deionized water were added, sequentially. The sample had a pH of 6.5 and a viscosity of 361 cps at 60 RPM.

Example 3

1209.61 g of EPON 828 (6.43 equiv; available through Shell Chemical, Houston Tex.), 387.97 g of methoxypropanol and 2.42 g of fluorescein (0.0073 mol, available through Aldrich Chemical) were charged into a three-necked round bottom flask fitted with a condenser and a nitrogen inlet. The sample was heated for 12 hours at 100° C. Afterwards, free fluorescein was not detectable by thin layer chromatography in acetone, indicating that the fluorescein had reacted with the epoxy. The epoxy equivalent weight of the sample was 246.

Example 4

A phosphatized epoxy having fluorescein grafted thereto was prepared by phosphatizing the fluorescein-grafted epoxy of Example 3 according to the method of Example 2. The final pH of the sample was 6.22.

Example 5

543.57 g of EPON 828 (2.89 equiv; available through Shell Chemical, Houston Tex.), 228.84 g of Bisphenol A (2.01 equiv; Dow Chemical, Midland Mich.), 137.33 g of xylene and 14.44 g of 500% rhodamine B were charged into a three-necked round bottom flask fitted with a condensor and a nitrogen inlet. The sample was heated for 3 hours at 130° C. after which the free rhodamine B content was determined to be almost completely reacted with the epoxy, as determined by thin layer chromatography in acetone. 257.44 g of diacetone alcohol, 171.63 g of cyclohexanone, 206.00 g of SOLVESSO 100 (a blend of aromatic solvents, also known as AROMATIC 100, commercially available from Exxon Chemical Company), 85.81 g of isophorone and 85.81 g of methyl amyl ketone were then added. The final epoxy equivalent weight was 2088.

FIG. 1 shows the ultraviolet visible absorption spectrum for free rhodamine B dye (unattached) and for rhodamine B covalently bound (attached) to a resin of the type described in Synthetic Examples 1 and 2 (also referred to herein as NUPAL 456BZR). Note that covalent attachment is signified by both a decrease in absorption coefficient and by a bathochromic shift of the wavelength of maximum absorbance from ca. 549 nm to ca. 554 nm.

Analysis of Coating Weight

Instrumentation

The measuring device used in these examples comprised a probe head that contained a light source and a main detector unit that are linked via an optical fiber. The probe head included a 4-watt short-wave mercury vapor lamp (Ultra Violet Products, Incorporated, Upland, Calif.) with a light blocking cloth shroud (Thorlabs, Incorporated, Newton, N.J.) around the perimeter of the lamp diffuser that enabled a 1×2 inch area to be illuminated by the light source without that area also being illuminated by ambient light. The light blocking cloth shroud was pierced by an SMA mating connector sleeve (model ADASMA, Thorlabs, Incorporated, Newton, N.J.) such that one end of the SMA connector mating sleeve was inside the light blocking cloth shroud while the other end was outside the light blocking cloth shroud. A hot mirror (model H43843 from Edmund Scientific Company, Barrington, N.J.) was in the front end of the SMA connector mating sleeve on the inside of the light blocking shroud. The optical fiber was a 2 meter long, 1000 micron core diameter fused silica fiber, terminated on both ends with SMA connectors (Ocean Optics Incorporated, Dunedin, Fla.). The main detector unit was a spectrograph comprising a single monochromator with a photodiode array (model AH4130, American Holographic, Incorporated, Fitchburg, Mass.). Operation and data manipulation was controlled via palmtop computer.

Calibration

Steel panels, as described below in Table 1, were obtained from ACT Laboratories, Hillsdale Mich. and from British Steel, Port Talbot, UK. Each panel was about 10.16 centimeters (cm) (4 inches) wide, about 30.48 cm (12 inches) long and about 0.76 to 0.79 mm (0.030 to 0.031 inches) thick. The steel panels were subjected to an alkaline cleaning process by immersion in a 2% by volume bath of CHEMKLEEN 163 which is available from PPG Industries, Inc. at a temperature of 60° C. (140° F.) for 30 seconds. The panels were removed from the alkaline cleaning bath, rinsed with room temperature water (about 21° C. (70° F.)) for 5 seconds and dried with an "air-knife".

The treated panels were treated with a solution of NUPAL 456BZR. The concentration of the NUPAL 456BZR (the rhodamine B-grafted organophosphate composition of Examples 1 and 2) was 3%, 5% and 10% by weight, based on total weight of the solution. All coating solutions were applied via roll coat application at 2.7×105 Pa (40 psi) and a rate of 56.4 meters/min (185 ft/min). Panels were immediately baked for 15 seconds to a peak metal temperature of 110° C.+6° C. (230° F.+10° F.).

A calibration procedure was performed in order to correlate the measured fluorescence signal intensity with the thickness of the coating containing the fluorescing agent. In the Examples provided in Table 1, 8 calibration standards (panels) were used, including 2 samples of a blank substrate which were cleaned, but not coated, 2 samples coated with the 5% resin solids coating composition, representative of a target coating thickness, 2 samples coated with the 3% resin solids coating composition, representative of a low coating thickness and 2 samples coated with the 10% resin solids coating composition, representative of a high coating thickness. Both sides of each panel were coated. Measurements were taken from the electrogalvanized side of the panels.

Figure 3:
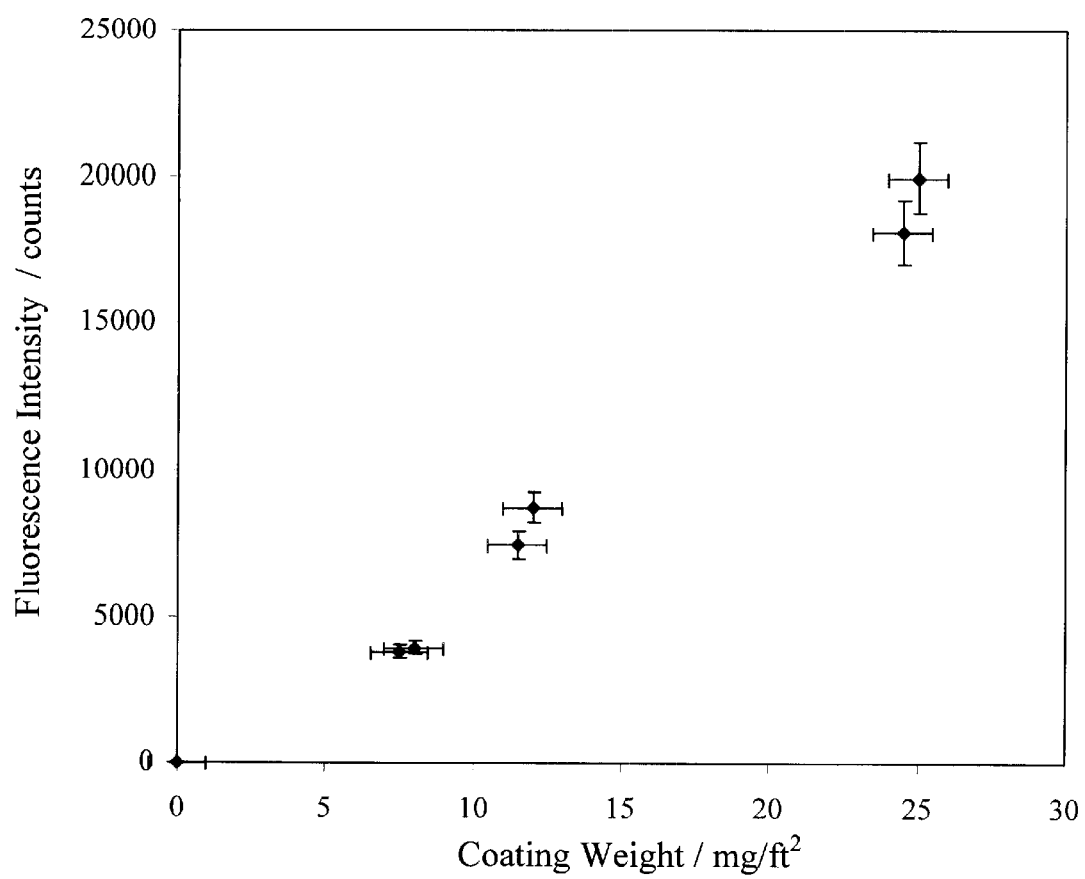
FIG. 3 is a calibration curve comparing fluorescence intensity and coating thickness for the coating of Examples 1 and 2.

FIG. 3 shows an example of a calibration plot using a pretreatment coating with covalently attached rhodamine B prepared according to the synthetic methods of the type described in Examples 1 and 2 (NUPAL 456BZR) and coated onto an electrogalvanized substrate. The Ce titration values are listed in Table 1, below.

Notably, as shown in FIG. 3, the relationship between fluorescence intensity and thickness of the coating is substrate-independent within a class of substrates. The calibration curve is the same for the ACT EG and the BS EG panels. This means that once a calibration curve is determined for a specific class of substrates, the calibration need no be repeated. This is important in commercial applications of the method of the present invention because the substrate often varies from batch-to-batch and depending on the commercial source of the substrate. The method of the present invention removes the necessity of constant recalibration with use of different batches of substrate.

Cerium Titration Procedure

Preparation of 0.1 M Potassium Dichromate ("PD")

30 g of analytical grade potassium dichromate was powdered finely in a agate mortar, and heated for 30–60 minutes in an air oven at 140–150° C. It was then allowed to cool in a closed vessel in a desiccator. 29.4 g of the dry potassium dichromate was transferred quantitatively to a 1 L graduated flask, using a small funnel to avoid loss. The salt was dissolved in the flask in water. The normality of the solution was calculated directly from the weight of the salt taken.

Preparation of 0.1M Ammonium Iron(II) Sulfate ("FAS")

An approximately 0.1M solution of ammonium iron (II) sulfate was prepared by dissolving about 9.8 g of the solid in 200 ml of sulfuric acid (0.5 M) in a 250 ml graduated flask, and then making up to the mark with distilled water. The solution was standardized by titration this solution into 1 ml 0.1 M potassium dichromate plus 25 ml sulfuric acid (0.5 M).

Preparation of 0.01M Ammonium Cerium(IV) Sulfate ("ACS")

An approximately 0.1M solution of ammonium cerium (IV) sulfate was prepared by dissolving about 6.4 g of the solid in 28 ml of concentrated sulfuric acid in 900 g distilled water in a 1 L flask, and then making up to the mark with distilled water. The solution was standardized by titrating 10 ml ACS in 25 ml distilled water and 1 ml concentrated sulfuric acid against the standardized, FAS above.

Protocol

A piece of the coated substrate was placed in a 250 ml Erlenmeyer flask. 25 ml of 0.01 N NaOH was added to the Erlenmeyer flask. The flask was heated (<5 min) until the solution temperature reaches 65° C. While maintaining a solution temperature of ~65° C., the sample was stripped by vigorous shaking for exactly 3 minutes. Immediately after stripping, the stripped coating was filtered through a vacuum filtration apparatus with 0.1 micron nylon filter paper to remove microscopic metal fragments which might yield a false reading. The metal strips were rinsed thoroughly with 10 ml of deionized water and decanted into the vacuum filtration funnel (combining the stripping and rinse solutions).

The combined solution was decanted into a clean 250 ml Erlenmeyer flask. 4 ml of 50% $H_2SO_4$ and 10 ml of 0.01N $Ce^{4+}$ reagent were added to the flask. This solution was reheated and digested for 3 minutes at 65° C. 2 drops of ferroin indicator were added to the digested solution (green color). The solution was titrated with 0.01N $Fe^{2+}$ reagent to an orange/brown endpoint. The volume (ml) of 0.01N $Fe^{2+}$ reagent consumed was recorded as "Sample."

$$\text{Coating weight calculation: mg/ft}^2 = \frac{(\text{Blank} - \text{Sample}) \times \text{Area factor}}{\text{Calibration factor}}$$

"Blank" is a chemicals only titration (25 ml—0.01N NaOH/4 ml—50%$H_2SO_4$/10 ml—0.01N $Ce^{4+}$ combined).

"Area factor" is 4.5/ft² for a 4×4 inch sample coated both sides; 9.0/ft² for one side.

"Calibration factor" was 0.9 ml/mg.

TABLE I

| ID No. (Type of Panels) | Coating SOLUTION | NUPAL ® Coating Weight ($Ce^{4+}/Ce^{3+}$ Titration) |
|---|---|---|
| (ACT EG[1]) | None (Clean Only) | 0 mg/ft² |
| (BS EG[2]) | None (Clean Only) | 0 mg/ft² |
| (ACT EG) | 3% NUPAL ® 456BZR pH = 4.7 (~30 ppm attached rhodamine B) | 7.5 mg/ft² |
| (BS EG) | 3% NUPAL ® 456BZR pH = 4.7 (~30 ppm attached rhodamine B) | 8.0 mg/ft² |
| (ACT EG) | 5% NUPAL ® 456BZR pH = 4.7 (~50 ppm attached rhodamine B) | 11.5 mg/ft² |
| (BS EG) | 5% NUPAL ® 456BZR pH = 4.7 (~50 ppm attached rhodamine B) | 12.0 mg/ft² |
| (ACT EG) | 10% NUPAL ® 456BZR pH = 4.7 (~100 ppm attached rhodamine B) | 24.5 mg/ft² |
| (BS EG) | 10% NUPAL ® 456BZR ph = 4.7 (~100 ppm attached rhodamine B) | 25.0 mg/ft² |

[1]ACT EG is E60, two-sided electrogalvanized cold-rolled steel from ACT Laboratories.
[2]BS EG is one-sided electrogalvanized cold-rolled steel (type No. APR10161) from British Steel.

We claim:

1. A coating composition adapted for fluorescence thickness measurement on a metal substrate, comprising:
   a resin component curable or dryable to form a solid film,
   a fluorescent tag component selected from the group consisting of acridine, anthraquinone, diphenylmethane, diphenylnapthlymethane, quinoline, and triphenylmethane dyes, wherein the fluorescence of said coating composition increases as a function of increasing thickness of said coating composition.

2. The coating of claim 1 wherein the resin is an epoxy ester of a phosphonic or a phosphoric acid.

3. The coating of claim 1, wherein the fluorescent tag component is a xanthene dye.

4. The coating of claim 3, wherein the fluorescent tag component is selected from the group consisting of fluorescein and rhodamine dyes.

5. A coating composition adapted for fluorescence thickness measurement on a metal substrate, comprising:
   a resin component curable or dryable to form a solid film;
   a fluorescent tag moiety chemically bonded to at least a portion of the resin component, and selected from the group consisting of acridine, anthraquinone, coumarin, diphenylmethane, diphenylnapthlymethane, quinoline, stilbene, and triphenylmethane dyes, wherein the fluorescence of said coating composition increases as a function of increasing thickness of said coating composition.

6. The coating of claim 5 wherein the resin is an epoxy ester of a phosphonic or a phosphoric acid.

7. The coating of claim 5, wherein the fluorescent tag moiety is selected from the group consisting of acridine, anthraquinone, diphenylmethane, diphenylnaphthlymethane, quinoline, and triphenylmethane dyes.

8. The coating of claim 5, wherein the fluorescent tag moiety comprises xanthene dye.

9. The coating of claim 5, wherein the fluorescent tag moiety is selected from the group consisting of fluorescein and rhodamine dyes.

10. The coating of claim 5, wherein the fluorescent tag moiety comprises rhodamine B.

11. A method for determining the thickness on a metal substrate of a curable or dryable film-forming coating comprising a fluorescent component and an organic resin, comprising the steps of:
   a. measuring the fluorescence intensity of the fluorescent component of the coating on the substrate when exposed to light which causes the fluorescent component to fluoresce;
   b. determining the thickness of the coating on the substrate by reference to a mathematical relationship between the fluorescence intensity of the coating when the coating is exposed to the light versus the coating thickness, wherein the fluorescence of said coating composition increases as a function of increasing thickness of said coating composition.

12. The method of claim 11, wherein the mathematical relationship is determined by:
   a. preparing a coating comprising the fluorescent component;
   b. coating two or more substrate samples with the coating at two or more thicknesses;
   c. measuring the fluorescence intensity of each sample when exposed to light which causes the fluorescent component to fluoresce;
   d. measuring the thickness of the coating for each sample; and
   e. determining a mathematical relationship between the fluorescence intensity of each coating as compared to the thickness of each coating.

13. The method of claim 11, wherein the coating comprises an epoxy ester of a phosphonic or a phosphoric acid.

14. The method of claim 11 wherein the coating comprises an organic resin and a fluorescent tag.

15. The method of claim 14, wherein the tag is covalently linked to resin.

16. The method of claim 14, wherein the tag is dye selected from the group consisting of acridines, anthraquinones, coumarins, diphenylmethanes, diphenylnaphthlymethanes, quinolines, stilbenes and triphenylmethanes.

17. The method of claim 14, wherein the tag is a xanthene dye.

18. The method of claim 14, wherein the tag is one of a fluorescein and a rhodamine.

19. The method of claim 14, wherein the tag is rhodamine B.

20. The method of claim 19, wherein the rhodamine B is covalently linked to the resin.

21. The method of claim 11, wherein the fluorescent component is at least a portion of the organic resin and the organic resin will fluoresce on exposure to ultraviolet light when coated on the substrate.

22. A method for determining the thickness on a metal substrate of a curable or dryable film-forming coating comprising a fluorescent component, comprising the steps of:
   a. determining a mathematical relationship between the fluorescence intensity of the coating when the coating is exposed to light which causes the fluorescent component to fluoresce, versus the coating thickness of the coating when the coating is applied to a substrate by:
      i. coating two or more substrate samples with the coating at two or more thicknesses;
      ii. measuring the fluorescence intensity of each sample when exposed to light which causes the fluorescent component to fluoresce;
      iii. measuring the thickness of the coating for each sample; and
      iv. determining the mathematical relationship between the fluorescence intensity of each coating as compared to the thickness of each coating, wherein the fluorescence of the coating composition increases as a function of increasing thickness of the coating composition;
   b. measuring the fluorescence intensity of the coating on a test substrate when exposed to the light; and
   c. determining the thickness of the coating on the test substrate by reference to the mathematical relationship.

23. A method for determining the thickness on a metal substrate of a curable or dryable film-forming coating comprising an organic resin having a fluorescent tag covalently linked thereto, comprising the steps of:
   a. determining a mathematical relationship between the fluorescent intensity of the coating when the coating is exposed to light which causes the fluorescent tag to fluoresce, versus the coating thickness for the coating when the coating is applied to a substrate, wherein the fluorescence of the coating increases as a function of increasing thickness of the coating;
   b. measuring the fluorescence intensity of the coating on a test substrate when exposed to the light; and
   c. determining the thickness of the coating on the test substrate by reference to the mathematical relationship between fluorescence intensity and thickness of the coating.

24. A method for determining the thickness on a metal substrate of a curable or dryable film-forming coating comprising an organic resin having a fluorescent xanthene dye covalently linked thereto, comprising the steps of:
   a. determining a mathematical relationship between the fluorescence intensity of the coating when the coating is exposed to light which causes the xanthene dye to fluoresce, versus the coating thickness of the coating;
   b. measuring the fluorescence intensity of the coating on a test substrate when exposed to light;
   c. determining the thickness of the coating on the test substrate by reference to the mathematical relationship between fluorescence intensity and thickness of the coating, wherein the fluorescence of the coating increases as a function of increasing thickness of the coating and further
   wherein the xanthene dye is present in the coating at 1 ppm to 2,000 ppm of the solids content of the coating.

25. A coated substrate comprising a metal substrate and a coating of a curable or dryable film-forming coating composition comprising a curable or dryable organic resin reacted with a fluorescent tag.

* * * * *